BEST AVAILABLE COPY

BEST AVAILABLE COPY

N. L. Tomlinson,

Treenail.

No. 4195. Reissued Dec. 6. 1870.

Witnesses:

Alex. F. Roberts

Geo. W. Webber

Inventor:

N. L. Tomlinson

Per Munn & Co

Attorneys.

N. PETERS, PHOTO-LITHOGRAPHER, WASHINGTON, D. C.

United States Patent Office.

NATHANIEL L. TOMLINSON, OF MYSTIC BRIDGE, CONNECTICUT.

Letters Pater No. 78,554, dated June 2, 1868; reissue No. 4,195, dated December 6, 1870.

IMPROVEMENT IN TREENAILS.

The Schedule referred to in these Letters Patent and making part of the same.

*To all whom it may concern:*

Be it known that I, NATHANIEL L. TOMLINSON, of Mystic Bridge, in the county of New London and State of Connecticut, have invented a new and improved Treenail; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
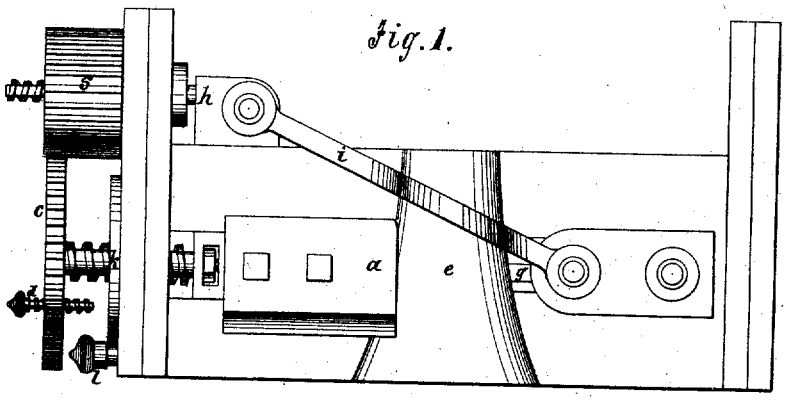
Figure 1 represents a front view of a machine on which my improved treenail can be made.

This invention has for its object to so construct a treenail for ships and other structures that the same can be readily applied to the timber.

The chief difficulty with the ordinary cylindrical treenail is that the same cannot be conveniently driven home on account of their considerable length, and for the same reason they were apt to injure the timber if not applied in a perfectly straight direction.

My invention consists in constructing a treenail in sections of varying diameters but equal lengths, so that the smaller inner sections will readily pass through the larger holes provided for the outer sections, the driving by force being only neccessary for the length of one section.

A in the drawing represents my improved treenail. It is made in two or more sections, that vary in size, the smallest section, *x*, being at the inner end, the one, *y*, being larger, while the largest, *z*, forms the outer end of the treenail.

I prefer to make the several sections or divisions of the same length, although they may be made different, if desired.

Figure 4:
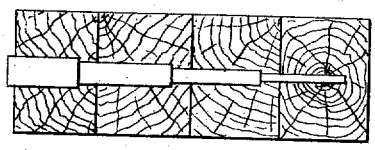
Figure 4 is a side view of the treenail, showing it inserted in the timber.

The hole bored in the timber for the reception of the tree-nail is of the same shape as the latter, *i. e.*, it is made in sections of different diameters, as is clearly shown in fig. 4.

The smaller sections of the treenail will readily pass through the larger sections of holes in the timber, and the hammer need, therefore, only be applied to force in the length of one section.

Figure 3:
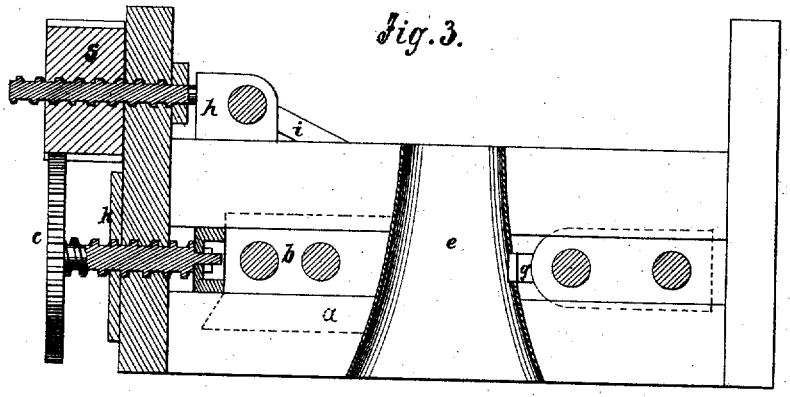
Figure 3 is a longitudinal horizontal section of the same.
Figure 2:
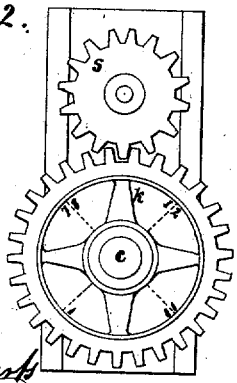
Figure 2 is an end view of the same.

In figs. 1, 2, and 3 of the drawing is shown a machine for making my improved treenail.

In this a knife, *a*, is attached to a slotted slide, *b*, worked by a screw-wheel, *c*, with a thumb-screw, *d*, for setting the same.

Opposite the knife *a*, which works in the box or cup *e*, I set or fix a gauge-rest, *g*, which is connected to the sliding screw *h* by means of the connecting-rods *i i*.

The slotted knife-slide is worked by the screw-wheel *c*. Behind this screw-wheel *c* I set a gauge-disk, *k*, operated and set by the thumb-screw *l*.

Playing into the screw-wheel *c* is another screw cog-wheel, *s*, working upon a reversed thread.

The stick out of which the treenail is to be made being inserted in the cup or box *k*, the knife *a* having been adjusted so as to give the required diameter, the gauge-rest *g* having, by the same movement, approached the knife by one-quarter of a turn of the wheel *c*, another size or diameter is obtained, and so on to any required diameter; and thus, as it were, a short driving treenail is made of a long one, the timber being first bored by augers of a size corresponding to the several diameters of the treenail, and when driven in makes a close shoulder fitting plug or fastening, as shown in fig. 4.

Having thus described my invention,

I claim as new and desire to secure by Letters Patent—

A treenail, made in sections of varying diameters, substantially as herein shown and described.

NATHANIEL L. TOMLINSON.

Witnesses:

WM. W. NOYES,

E. P. RANDALL.